June 16, 1925.
M. R. CONE
1,542,035
DISPERSION OF BITUMINOUS MATERIALS AND PROCESS OF MAKING SAME
Filed May 30, 1923
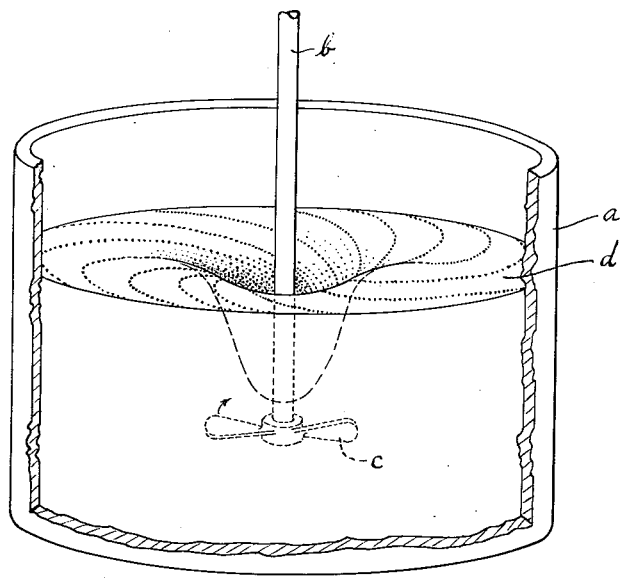
INVENTOR
Mark R. Cone
BY
Albert M. Austin
ATTORNEY Patented June 16, 1925.

1,542,035

UNITED STATES PATENT OFFICE.

MARK R. CONE, OF BALTIMORE, MARYLAND, ASSIGNOR TO THE UNION TRUST COMPANY, OF CLEVELAND, OHIO, A CORPORATION OF OHIO.

DISPERSION OF BITUMINOUS MATERIALS AND PROCESS OF MAKING SAME.

Application filed May 30, 1923. Serial No. 642,372.

To all whom it may concern:

Be it known that I, MARK R. CONE, a citizen of the United States, and resident of Baltimore, and State of Maryland, have invented certain new and useful Improvements in Dispersions of Bituminous Materials and Processes of Making Same, of which the following is a specification.

This invention relates to a process for the treatment of bituminous materials to render the same completely miscible in water without the admixture of any emulsifying agents, such as caustic soda or other alkaline substances.

Bituminous materials, such as natural, residual and artificial asphalts, and asphaltic materials, such as petroleum residues and oxidized petroleums, with or without oil fluxes which are sometimes combined with resins, are extensively employed for coatings and binders. In using these bituminous substances and in making same available for ready application they have been either heated to a sufficient temperature to admit of proper spreading or else thinned with animal, vegetable or mineral oils, more particularly the lighter hydrocarbon oils.

The inconveniences and expense incident to the heating and the losses occasioned by volatilization of the dissolving liquid and the expense of bringing the bituminous material in the proper state of solution have made it highly desirable to devise a product wherein the bituminous material will be in a condition that will permit the same to be spread at ordinary temperature upon the surface to be covered without local heat treatment or the use of these organic solvents or thinners. To accomplish this, it has been recognized of late years by numerous persons engaged in the art that if the bituminous material could be brought into a fine state of subdivision and in proper admixture with a cheap fluid, such as water, so that the resulting mixture would possess the proper mobility by reason of the bituminous material being in a proper state of dispersion, that the disadvantages incident to the prior uses of the bituminous materials and to their former conditions would be largely overcome.

Various attempts have been made to solve this problem. Among these may be mentioned the addition of a colloid, such as tannic acid, to the water and the incorporation of finely ground, solid bituminous material with the aqueous colloid solution. In such a mass, the particles of bituminous material become coated with the protective colloid which prevents or retards their coalescence into a continuous mass.

In other attempts to solve this problem, caustic alkalies, such as NaOH, have been used for treating the bituminous material, but these have also proved unsatisfactory.

Many attempts to dispense with the use of the caustic alkalies and colloids have also been made and consist in the addition of liquid bituminous material to water, while agitating the mass. These attempts have proved not only unreliable but unsuccessful and such processes have not produced a satisfactory product having the bituminous material properly dispersed in the aqueous medium with the particles of bituminous material remaining uncoalesced for any long period. The failure of these prior attempts to give satisfactory results may be explained as follows:

When the fluid bituminous material is introduced into the bath of cooler water, the molecules coming in direct, immediate contact with the bath are cooled to the temperature of the bath and become set. The fluid bitumen not in direct, immediate contact with the bath will maintain its fluid condition until by conduction it is cooled to a setting temperature, and if the bath is stationary the bituminous material will deposit in practically a continuous mass in the liquid and remain in a state of immiscibility with the bath of liquid. If, however, the bath is in a state of uniform motion, on reaching the bath, the molecules of the fluid bitumen in direct, immediate contact with the bath will become set and carried along by the moving bath. The other portion of the fluid bitumen not in direct, immediate contact with the bath will, as long as the proper condition of fluidity exists, allow the moving bath of liquid to draw and pull and thus attenuate the bitumen into films, laminæ or threads, depending upon the character of the motion of the liquid. This attenuation, however, is not sufficient to materially affect the bitumen and there is also deposited a practically continuous mass of bituminous material in the liquid which remains in a state of immiscibility with the bath of liquid.

This invention relates particularly to an improved process whereby the bituminous material or substance, such as asphalt, pitch, hydrocarbon residues or mixtures thereof, may be stored for an indefinite period or transported from place to place in a condition which will permit the same to be spread while at ordinary atmospheric temperature upon the surface to be covered, such as a roof, a wall or a roadway in a layer or a plurality of layers of any desired thickness without local treatment or the application of heat or any change whatever except the addition of a sufficient quantity of water to produce the desired flow of the material.

Among the objects of this invention is to provide a process whereby the particles of bituminous material are dispersed in water and of such size, shape and condition as to admit of their remaining in an isolated and uncoalesced state with respect to each other for any period desired, which state of dissociation and non-coalescence will remain undisturbed while the material is in transit or storage and which state becomes readily disturbed when the aqueous material is removed therefrom, such as on exposure to evaporation in the atmosphere, thereby resulting in a coalesced mass of continuous bituminous material.

A further object of the invention is to provide a product in the form of a bituminous paste or cement that is semi-solid and plastic, capable of being maintained in this condition for indeterminate periods of time and of being spread in layers or formed into shapes in molds or dies, which will coalesce upon being subjected to distillation or evaporation to form a compact, coherent and durable substance possessing substantially all the qualities inherent in the material from which it was originally formed.

Furthermore, the invention consists in the new and novel details and features of operation and the novel combinations and arrangements of steps in the process for the treatment of bituminous substances hereinafter set forth and claimed.

In carrying out this invention, I first provide a bath of water and add thereto bituminous material, such as asphalt in fluid state, while subjecting the bath to suitable motion and agitation. By this motion the liquid comprising the bath is linearly accelerated, so that each unit portion of the liquid having the accelerated velocity will move faster than its succeeding portion, and will eventually be separated therefrom. If such liquid is in contact with the fluid bitumen, the movement of these adjacent liquid portions away from each other will exert a pulling or drawing action upon the adjacent portions of fluid bitumen in contact with the liquid, severing such portions of bitumen continuously from each other and thereby exposing a fresh portion of the fluid bitumen to contact with the liquid of the bath. This continuous severing of the adjacent portions of bitumen from each other and the bringing of fresh fluid bitumen in contact with the body of liquid results in rapid attenuation of the fluid bitumen and in ultimate comminution thereof into finely divided particles. This atomization of the bitumen may be carried on so as to produce particles of microscopic and even colloidal size.

By producing such a high degree of attenuation, subdivision and comminution of the bitumen, the surface of the particles of bitumen acquire a greater affinity and attraction for the water than for the other particles of bitumen, thereby counteracting the natural tendency of the particles of bitumen to coalesce with each other and conditioning the bitumen to exist in this finely divided state in the aqueous medium. The particles of bitumen are isolated from each other, the films of water serving as an insulating medium between the individual particles, opposing their agglomeration and coalescence.

The velocity and character of the motion of the bath is one of the important features of this invention. The incoming material must be subjected promptly, before it is set, to a continuous and multi-pulling and attenuating action operative to draw or pull out the material into fine threads, laminæ or films, which action must be continued until the attenuated product is broken up into fine particles of an elliptical or globular form instead of pieces having sharp edges or points. This pulling and attenuating action is effectively produced by a whirling motion of the bath that forms a vortex at or near its center, in which the material approaching and passing through the vortex has considerably greater speed of movement than the material at or near the periphery of the bath. This characteristic motion to the body of the bath may be imparted in any desired manner, for example, by a propeller having blades of the proper angle and pitch.

The regulation of the temperature of the bath and that of the incoming bituminous material is also one of the features of my invention. These temperatures must be regulated within comparatively narrow limits for any particular bituminous material, but the optimum temperature limitations of the incoming bitumen and bath vary with different bituminous materials. The temperature of the incoming bitumen is higher than that of the bath of water, and the temperature of the latter should be such that when the bituminous material is cooled to the temperature of the bath it will have become properly set to admit of its further handling without the particles becoming coalesced or agglomerated.

The attenuation and subdivision takes place during the period of transition of the bitumen from its temperature at introduction of that of setting. This transition period is of very short duration, and it is, therefore, necessary for the attenuation and subdivision of the bitumen to be accomplished in such short period, which begins from the instant the bitumen is introduced into the bath.

Another feature of my invention consists in the proper positioning of the rotating agitator or propeller in the bath. Not only is it necessary that the proper attenuation and subdivision be accomplished in the bitumen, but in order to obtain a suitable and desirable product it is also necessary that all of the bitumen be given this treatment and transformation. Otherwise, only a partial attenuation and subdivision will take place and the bitumen which has not been given such treatment and transformation will not only impair the product because of the agglomeration and coalesced masses therein but will operate to bring about coalescence of the otherwise non-coalescing particles. By suitably adjusting the propeller so that the liquid at the surface is drawn into a rapidly moving accelerating vortex and then dispersed into a more slowly moving body of zone of the bath, I obtain a compound motion of the liquid of the bath resulting in all of the liquid being subjected at very short intervals to the varying linear velocities in the various parts of the bath.

To practice the process successfully it is necessary to preserve a proper relationship between all of the above factors, each of which appears to be almost equally important toward obtaining a product possessing the requisite and necessary characteristics. By adjusting the temperatures of the bath and incoming fluid bitumen so that their difference in temperature will admit of proper attenuation and subdivision of the bitumen during the transition period and delivering the incoming fluid bitumen to the bath so that it will be subjected promptly to the pulling effect of the accelerated velocity of the moving liquid produced by adjusting the position, speed and pitch of the propeller or rotating agitator, the bitumen will be dispersed into fine particles in the liquid, which particles under microscopic examination show curved outlines of spheroidal or ellipsoidal shapes and have such a very high affinity for the water that they are attracted to and by the water with greater force than to each other, thereby, combating the natural tendency of the particles to fuse, agglomerate and coalesce with each other.

If, however, the process is not properly practiced and if the various factors embodying the features of my invention are not properly coordinated so that during the transition period the bitumen is not properly attenuated and subdivided because the cooling has been too rapid or too slow due to an improper temperature of the bath or an insufficient difference of temperature between the bath and incoming fluid bitumen, or because there has been an insufficient speed or improper fluidity of the bath, or a failure to subject the incoming fluid bitumen to the zone of the bath having the accelerated linear velocity or an improper positioning or pitching of the propeller or rotating agitator, there will be produced in the mass either no substantial comminution of the bitumen or else there will be varying amounts of agglomerated masses and particles of finely divided bitumen, which under the microscope show, not spheroidal or ellipsoidal forms, but particles with edges and points, more or less defined, which points and edges operate to puncture the films of liquid enveloping these particles, thereby promoting fusion, agglomeration and coalescence of the particles.

In carrying out this invention, starting with water as a bath and with bituminous material such as asphalt in a fluid state, the aqueous bath is gradually built up to meet the conditions of satisfactory and efficient working operation. At the start, the viscosity of the water bath is relatively low to that of the bath under proper working conditions and a relatively lower propeller speed will suffice. Also, in order that the proper dragging, pulling and attenuating effect be produced on the fluid bitumen which is delivered to the bath, the viscosity of the incoming fluid bitumen should be maintained at a relatively low point and as the viscosity of the bath increases the fluid bitumen may also have a higher viscosity.

The temperature of the water bath is regulated according to the character of the bituminous material to be treated. This temperature may vary, for example, from 110 to 140° F., but preferably it should not exceed the liquefying point of the bitumen, and must always be lower than the temperature of the incoming bitumen. In starting, the incoming fluid bitumen is of lower viscosity and therefore at a higher temperature than that employed after the process is fully operative, and the water bath may, therefore, be at a correspondingly higher temperature than during regular operation and, at the same time, provide the proper difference in temperature between the incoming fluid bitumen and the bath. As the viscosity of the bath increases, that of the incoming fluid bitumen may also be increased, and the temperature of both the incoming bitumen and the bath be correspondingly reduced.

In some instances, especially when operating with unskilled labor, it may be found convenient to build up the viscosity of the bath by the addition of some inert substance, such as clay, or other finely divided solid substance, or by the addition of neutral animal or vegetable oils, which do not have a solvent action on the bitumen, because these additional inert substances permit greater latitude in the range of variation of the several factors incident to this process. If clay is employed, it may vary from a trace to about 40% of the amount of bituminous material.

The run may also be started by taking some of the finished product and stirring it up in water, until a bath of the desired viscosity is obtained, and raising this bath to the proper temperature relative to the incoming bitumen. After the bath has been built up to the proper condition, the process may be continued indefinitely by supplying suitable quantities of fluid bitumen and water with or without the addition of any viscosity-increasing, inert substances.

As a specific example of practicing my invention on a commercial scale, the method of treating by my process a standard and well-known material, for example, the asphalt known as standard asphalt macadam binder C, produced from heavy Mexican crude oil at the Baltimore refinery of the Standard Oil Company of New Jersey will be illustrated. An analysis of this material is as follows:

| | |
|---|---|
| Specific gravity at 60° F | 1.042 |
| Weight per gallon at 60° F | 8.68 lbs. |
| Flash point (open cup) | 470° F. |
| Melting point (Ball & Ring) | 118° F. |
| Penetration 77° F | 90 |
| Penetration 32° F | 26 |
| Penetration 115° F | ----- |
| Volatility of 20 grams in 5 hrs. at 325° F. | .05% |
| Penetration of residue | 71 |
| Ductility | 80 plus. |
| Soluble in carb. bisulphide | 99.8% |
| Soluble in 76 naptha | 77.1% |
| Fixed carbon | 15.0% |

The asphalt is first heated to a temperature of 250 to 275° F. in any suitable apparatus, such as a standard type of melting tank or jacketed kettle. The bath, which may consist of previously treated material, is held in a suitable container, for instance, a standard jacketed circular tank or kettle, provided with a propeller or agitator, having blades approximately one-third the radius of the tank or kettle, and set at a pitch that will produce the special movement of the bath hereinafter described.

The bath is heated to a temperature of approximately 110° F., and the propeller is set in motion so as to cause the mass of the bath in the upper portion of the container above the propeller to move in a direction from the outer wall of the container toward the axis and downward, and to travel in a reverse direction in the lower portion of the container below the propeller. The movement of the bath in the upper portion of the container above the propeller is one of acceleration from the outer circumference of the container to the axis and downward to the propeller, thereby forming a vortex, and from a point between the circumference and the axis, usually approximately one-half way, this acceleration of the bath increases greatly and the movement becomes very rapid.

The liquid asphalt is supplied as needed, preferably continuously and in suitable quantities, to the bath in a stream or streams, such as a spray, for example, about one-half way between the circumference and the axis of the container and in the upper portion of the container above the propeller. As the dispersion of the asphalt in the bath proceeds, the temperature of the bath tends to increase and the viscosity of the bath also increases. The temperature may be permitted to increase until it reaches approximately 120° F., when preferably any further increase in temperature is checked in a suitable manner, as by circulating cooling water through the jacket of the container. As the viscosity of the bath increases, water is added from time to time in suitable volume to maintain the fluidity of the bath within such limits that the proper movement of the bath as herein described will take place without material deviation. The temperature of the incoming water is regulated so as not to vary substantially the temperature of the bath.

In the accompanying diagrammatic drawing I have illustrated diagrammatically the apparatus employed in carrying out my improved process, in which a container or jacketed kettle $a$ is provided with a propeller $c$ driven in any suitable manner, as by a shaft $b$, whereby the vortex may be produced in the material being treated. This vortex is indicated by dotted lines, but it will be understood that it is impractical to show accurately the exact path of any particles in the material through the vortex, nor is it necessary for the material to follow any such precise and defined path in practising the process.

It will be further understood that the standard forms of receptacles or kettles may be employed, and that the form, proportions, position and speed of the propeller may be varied, provided only a definite vortex is produced in which the asphalt is subjected to a pulling and attenuating movement at the proper temperature and for the appropriate period of time sufficient to break up and disperse into particles of the desired fineness the incoming bituminous or other material.

The total volume of the bath is preferably maintained approximately constant by removing from time to time or in a continuous manner a quantity of the bath, after it carries a sufficient amount of dispersed asphalt, in volume equal to the combined volume of the incoming asphalt and water. This dispersion of asphalt may be discharged into storage vessels or containers for further cooling, and constitutes the finished product of the process.

The dispersed asphalt in the water which is removed from the bath may be allowed to settle and any excess, supernatant liquid is removed by decantation or any other suitable means. The mass which remains after removing the supernatant liquid has the appearance of a semi-liquid, finely grained, somewhat oleaginous paste in which the larger particles are visible to the naked eye. The water forming the dispersion medium for the dissociated and dispersed bituminous material, having particles approaching colloidal size, is deeply colored as a result of such dispersed particles in suspension. This paste is very stable in character and will maintain its characteristics indefinitely unless the moisture is removed from the mass by distillation, evaporation or in some similar manner, when the particles will coalesce to form a homogeneous body of the bituminous material similar in practically all respects as to chemical analysis and physical characteristics to the original substance prior to treatment.

When the paste is spread out in a layer or coating, however, the moisture evaporates and thereupon the particles coalesce to form a continuous, coherent and homogeneous layer possessing substantially all of the properties and characteristics of the original bituminous substance and forming a close, compact, coherent body or layer particularly adapted to form a surface coating especially for roadways and places where resisting qualities are required.

It is not essential that the water supplied to the bath be free from suspended solid matter, provided such solid matter is chemically neutral and inert with respect to the asphalt, said solid matter serving merely as a filler or extender in the finished product.

If such a filler or extender is desired in the finished product, it may be added to the bath with the water of dispersion or in any other suitable manner and in such quantity as may be desired. It will also be obvious that where special products are desired that particular substances, for example, inert materials such as pigments, may be added to the bath, together with the asphalt and water so as to become incorporated with or distributed through the bath and thus become part of the final product.

This invention may be applied to the preparation of dispersions of many liquefiable substances in liquids ordinarily immiscible therewith. These include the general class of bituminous materials, of native and artificial origin and also the pitches derived from the tars and tar products obtained in the various industries, the oil pitches obtained in the distillation and cracking of animal, vegetable and petroleum oils of asphalt, paraffine, naphthene or other base and those pitches resulting from destructive distillation of organic matter of animal, vegetable or mineral origin.

This invention contemplates the treatment of bitumens and other liquefiable substances heretofore described of high or low melting points. If the bitumens or other substances which are fluid at ordinary temperatures are treated, the aqueous bath is cooled in order to provide the proper difference in temperature between the incoming fluid bitumen or other substance and the bath and the proper cooling of the particles to bring about their proper setting. Likewise, in the case of bitumens or other substances of high melting point, if it is desired to have the aqueous bath at temperatures above 212° F., suitable materials may be added to raise the boiling point.

This invention also contemplates the dispersion of the bitumen or these other substances in liquids other than water, which do not have a solvent action on the material being dispersed and which will have a greater affinity for the particles of finely divided material than the particles have for each other.

This invention is adapted to the manufacture of dispersed bituminous and other materials with particles of various sizes, and the degree of dissociation may be carried to the extent of producing particles of approximately collodial size. Other things being equal, increase of speed and prolongation of the period during which the incoming fluid material being dispersed is brought to the setting temperature, results in greater attenuation and a finer subdivision of the particles.

The expression "linear" is used to denote length wherever it appears in the description and claims.

It will be understood that the term "bituminous material", as used by me, is intended to include other and similar liquefiable substances having analogous properties, such as resins, coal tar products and pitches, as well as asphalts and similar products. Also it will be understood that where I specify the bituminous material is introduced into the zone of the moving liquid, I intend to include the immediate vicinity of such zone which, for the purposes of my process, will give approximately the same results.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of dispersing a herein described heat liquefiable substance in a liquid ordinarily immiscible therewith, the steps which include subjecting said substance in a fluid state to tension and accelerated motion in the presence of said liquid.

2. In a process of dispersing a herein described heat liquefiable substance in a liquid ordinarily immiscible therewith, the steps which include subjecting said substance in a fluid state and in the presence of said liquid to tension, accelerated motion and progressive severing of its constituent particles.

3. In a process of dispersing a herein described heat liquefiable substance in a liquid ordinarily immiscible therewith, the steps which include subjecting said substance in a fluid state to high tension and progressive severing of its constituent particles into minute, non-coalescing globules by the action of said liquid moving with an accelerated velocity.

4. In a process of dispersing bituminous material in water, the steps which include subjecting said bituminous material in a fluid state to accelerated motion and high tension by the action of water moving with accelerated linear velocity.

5. In a process of dispersing bituminous material in water, the steps which include subjecting said bituminous material in a fluid state and in the presence of the water to tension, accelerated motion and progressive severing of its constituent particles.

6. In a process of dispersing bituminous material in a liquid ordinarily immiscible therewith, the steps which include subjecting said bituminous material in a fluid state to high tension and progressive severing of its constituent particles into minute, non-coalescing globules by the action of said liquid moving with an accelerated velocity.

7. In a process of dispersing asphalt in water, the steps which include subjecting the asphalt in a fluid state to high tension and progressive severing of its constituent particles into minute, non-coalescing globules by the action of the water moving with an accelerated velocity.

8. A process comprising introducing fluid bituminous material into a bath of moving liquid ordinarily immiscible therewith so as to be immediately propelled by the moving liquid into the zone where the liquid is moving at an accelerated velocity.

9. A process comprising introducing a herein described heat liquefiable substance in a fluid state into a bath of moving liquid ordinarily immiscible therewith in the immediate vicinity of the zone where the bath of liquid is moving at an accelerated velocity, adjusting and maintaining the temperature of the bath to admit of high degrees of attenuation and dispersion before the substantial solidification of said liquefiable substance.

10. A process comprising introducing fluid bituminous material into a bath of moving liquid ordinarily immiscible therewith at such zone where the liquid is moving at an accelerated velocity, adjusting and maintaining the difference in temperature between the bath and the incoming fluid bitumen to admit of high degrees of attenuation and dispersion before the substantial solidification of said bitumen.

11. A process comprising introducing fluid asphalt into a moving, aqueous bath at such zone where the water is moving at an accelerated velocity, adjusting and maintaining the difference in temperature between the bath and the incoming fluid asphalt to admit of high degrees of attenuation and dispersion before the substantial solidification of said asphalt.

12. A process comprising introducing fluid bituminous material into a bath of rotating liquid ordinarily immiscible therewith in the immediate vicinity of the zone where the liquid is moving at an accelerated velocity, adjusting and maintaining the difference in temperature between the bath and the incoming fluid bitumen to admit of high degrees of attenuation and dispersion before the substantial solidification of said bitumen.

13. A process comprising introducing fluid bituminous material into a bath of moving liquid ordinarily immiscible therewith in the immediate vicinity of the zone where the liquid is moving at an accelerated velocity, adjusting and maintaining the temperature of the bath and regulating the motion of the bath to admit of high degrees of attenuation and dispersion before the substantial solidification of said bitumen, 14. A process comprising introducing a liquefiable substance in a fluid state into a cooler bath of a liquid ordinarily immiscible therewith, subjecting said fluid substance to the immediate action of attenuating forces comprising a powerful drawing action by said liquid and dissociating said fluid substance into globules approaching colloidal size and non-coalescent with each other in said liquid.

15. A process comprising introducing a liquefiable substance in a fluid state into a bath of moving liquid ordinarily immiscible therewith in the immediate vicinity of the zone where the liquid is moving at an accelerated velocity, said bath of liquid being subjected to a compound motion resulting in all of the liquid undergoing, at very short intervals, the varying linear velocities in the various parts of the bath.

16. A process comprising introducing fluid bituminous material into a moving, aqueous bath in the immediate vicinity of the zone where the water is moving at an accelerated velocity, said aqueous bath being subjected to a compound motion resulting in all of the water undergoing, at very short intervals, the varying linear velocities in the various parts of the bath.

17. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material and subjecting said bituminous material to the attenuating force.

18. In a process of dispersing bituminous material in water, introducing the bituminous material into a bath of water, maintaining the bath at temperatures where the bituminous material introduced therein will have fluidity admitting of high degree of attenuation when subjected to a force operating to attenuate said bituminous material and subjecting said bituminous material to the joint action of the attenuating force and a force operating to dissociate the attenuated bituminous material into fine particles.

19. In a process of dispersing bituminous material in a liquid ordinarily immiscible therewith, introducing the bituminous material into a bath of said liquid, maintaining the bath at temperatures and viscosity where the bituminous material introduced therein will have fluidity admitting of high degree of attenuation when subjected to a force operating to attenuate said bituminous material and subjecting said bituminous material to the attenuating force.

20. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material and subjecting the bath to a motion operating to bring the bituminous material introduced therein under the action of the attenuating force.

21. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material, imparting motion to the bath of said liquid and subjecting said bituminous material to an attenuating force comprising a drawing action by the moving liquid bath.

22. In a process of dispersing bituminous material in a liquid ordinarily immiscible therewith, introducing bituminous material in a fluid state into a bath of said liquid, establishing a transition period by adjusting the temperature of the bath to that of the incoming bituminous fluid during which period said bituminous fluid is cooled from its incoming temperature to that of the bath, imparting motion to the bath of said liquid and subjecting said bituminous fluid during the transition period to an attenuating force comprising a drawing action by the moving liquid bath.

23. In a process of dispersing bituminous material in a liquid ordinarily immiscible therewith, introducing bituminous material in a fluid state into a bath of said liquid, establishing a transition period by adjusting the temperature of the bath to that of the incoming bituminous fluid during which period said bituminous fluid is cooled from its incoming temperature to that of the bath, imparting motion to the bath of said liquid by means adjusted within said bath and operating at sufficient velocity to draw during the transition period all of the bituminous fluid introduced into the bath into the sphere of attenuation and dispersion.

24. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material, imparting accelerating motion to the bath of said liquid and subjecting said bituminous material to an attenuating force comprising a drawing action by the moving liquid bath.

25. In a process of dispersing bituminous material in a liquid ordinarily immiscible therewith, the steps which include subjecting the bituminous material in a fluid state to high, increasing tension and accelerated motion in the presence of said liquid.

26. In a process of dispersing a liquefiable substance in a liquid ordinarily immiscible therewith, the steps which include subjecting said substance in a fluid state to high, increasing tension and motion having increasing acceleration in the presence of said liquid.

27. In a process of dispersing a liquefiable substance in a liquid ordinarily immiscible therewith, the steps which include subjecting said substance in a fluid state to high, increasing tension and motion having increasing acceleration by the action of said liquid moving with a velocity having increasing acceleration.

28. A bituminous dispersion comprising essentially finely divided particles of bitumen of curved outlines which show on microscopic examination spheriodal and ellipsoidal shapes, said particles having insulating films composed of substantially unmodified liquid ordinarily immiscible therewith opposing their coalescence and agglomeration.

29. A bituminous composition comprising essentially a dispersion, in a liquid ordinarily immiscible therewith and substantially free from alkalies and protective colloids, of minute, bituminous globules in a state of isolation from each other.

30. A bituminous dispersion comprising essentially dissociated particles of bitumen of curved outlines which show on microscopic examination spheroidal and ellipsoidal shapes, said particles having adhering, insulating films of a liquid, ordinarily immiscible therewith and substantially free from alkalies and protective colloids, opposing their coalescence and agglomeration.

31. A bituminous dispersion comprising essentially dissociated particles of bitumen of curved outlines which show on microscopic examination spheroidal and ellipsoidal shapes, said particles having adhering, insulating films composed of water opposing their coalescence and agglomeration.

32. A pasty, bituminous composition, comprising essentially minute globules of bitumen isolated from each other by films composed of substantially unmodified liquid ordinarily immiscible therewith.

33. A settling bituminous emulsion comprising essentially a dispersion, in a liquid ordinarily immiscible therewith and substantially free from alkalies and protective colloids, of noncoalescing, bituminous globules in a state of isolation from each other.

34. A new article of manufacture comprising bituminous material in the form of finely divided particles, each of said particles being surrounded by a film composed of substantially unmodified liquid, the said particles forming a plastic, homogeneous mass miscible in water.

35. As a new article of manufacture, a plastic material comprising particles of bitumen in a finely divided state, the said particles being combined with a liquid composed of water in quantity sufficient to prevent coalescence while said particles are in a moist condition and adapted to coalesce when the water is removed.

36. A bituminous composition for use as a surface covering comprising particles of bituminous material dispersed in an agent composed of substantially unmodified liquid to form a mass of separate particles capable of being spread in a thin layer to form a surface coating, the said particles being adapted to coalesce upon evaporation of the liquid to form a dense, hard, homogeneous layer non-miscible in water.

37. A bituminous composition capable of use as a surface covering comprising minute particles of bituminous material dispersed substantially in the colloid state in an agent composed of substantially unmodified non-solvent liquid, the said particles being of approximately the same consistency and composition throughout and normally prevented from coalescence by adsorbed moisture on the surface of the particles but coalescing to form a continuous, homogeneous layer when said moisture is evaporated.

Signed at Baltimore and State of Maryland this 28th day of May, 1923. A. D.

MARK R. CONE